(12) United States Patent
Miller

(10) Patent No.: US 8,336,816 B2
(45) Date of Patent: Dec. 25, 2012

(54) SLIDING FRAME AIRCRAFT LAUNCHER

(75) Inventor: Stephen W. Miller, Cockeysville, MD (US)

(73) Assignee: AAI Corporation, Hunt Valley, MD (US)

( * ) Notice: Subject to any disclaimer, the term of this patent is extended or adjusted under 35 U.S.C. 154(b) by 468 days.

(21) Appl. No.: 12/582,208

(22) Filed: Oct. 20, 2009

(65) Prior Publication Data

US 2010/0096496 A1     Apr. 22, 2010

Related U.S. Application Data

(60) Provisional application No. 61/106,868, filed on Oct. 20, 2008.

(51) Int. Cl.
  *B64F 1/04*      (2006.01)
(52) U.S. Cl. .......................................................... 244/63
(58) Field of Classification Search ................. 244/63
  See application file for complete search history.

(56) References Cited

U.S. PATENT DOCUMENTS

| | | | | |
|---|---|---|---|---|
| 922,710 | A * | 5/1909 | Means | 244/63 |
| 922,711 | A * | 5/1909 | Means | 244/63 |
| 975,953 | A * | 11/1910 | Hourwich | 124/1 |
| 1,347,105 | A * | 7/1920 | Le Mesurier | 244/63 |
| 1,535,475 | A * | 4/1925 | Jeansen et al. | 244/63 |
| 1,777,167 | A * | 9/1930 | Forbes | 244/63 |
| 1,797,514 | A * | 3/1931 | Richter | 244/63 |
| 1,798,880 | A * | 3/1931 | Heinkel | 244/63 |
| 1,802,649 | A * | 4/1931 | Heinkel | 244/63 |
| 1,879,765 | A * | 9/1932 | Richards | 244/63 |
| 1,887,528 | A * | 11/1932 | Stein | 244/63 |
| 1,898,884 | A * | 2/1933 | Mitchell | 244/63 |
| 1,960,264 | A * | 5/1934 | Heinkel | 244/63 |
| 2,083,805 | A * | 6/1937 | Adams | 244/63 |
| 2,375,449 | A * | 5/1945 | Unger et al. | 244/63 |
| 2,672,306 | A * | 3/1954 | Doolittle et al. | 244/63 |
| 2,756,950 | A * | 7/1956 | Greenough | 244/63 |
| 2,926,871 | A * | 3/1960 | Bless | 244/63 |
| 2,955,545 | A * | 10/1960 | Nichols et al. | 104/178 |
| 2,969,942 | A * | 1/1961 | Scheuerman | 244/63 |
| 3,138,352 | A * | 6/1964 | Saholt | 244/63 |
| 3,428,273 | A * | 2/1969 | Tyler | 244/63 |
| 3,433,438 | A * | 3/1969 | Petransky et al. | 244/63 |
| 3,446,461 | A * | 5/1969 | Riblett, Jr. | 244/63 |
| 3,905,350 | A * | 9/1975 | Becker | 124/17 |
| 3,968,947 | A * | 7/1976 | Schlegel et al. | 244/63 |
| 4,238,093 | A * | 12/1980 | Siegel et al. | 244/63 |
| 4,678,143 | A * | 7/1987 | Griffin | 244/63 |
| 4,909,458 | A * | 3/1990 | Martin | 244/63 |

(Continued)

OTHER PUBLICATIONS

International Search Report of PCT/US2009/061318 filed Oct. 20, 2009.

*Primary Examiner* — Tien Dinh
*Assistant Examiner* — Michael A Fabula
(74) *Attorney, Agent, or Firm* — Venable LLP; Jeffri A. Kaminski; Steven J. Schwarz

(57) ABSTRACT

An aircraft launcher includes a base frame, a first sliding frame that slides with respect to the base frame, a second sliding frame that slides with respect to the first sliding frame, an aircraft support located on the second sliding frame, and a drive apparatus adapted to slide at least one of the first sliding frame and the second sliding frame with respect to the base frame.

17 Claims, 21 Drawing Sheets

U.S. PATENT DOCUMENTS

| | | | | |
|---|---|---|---|---|
| 5,961,069 A * | 10/1999 | Perrier | | 244/63 |
| 6,457,673 B1 * | 10/2002 | Miller | | 244/63 |
| 6,508,435 B1 * | 1/2003 | Karpov et al. | | 244/2 |
| 6,626,399 B2 * | 9/2003 | Young et al. | | 244/63 |
| 6,851,647 B1 * | 2/2005 | Rosenbaum et al. | | 244/63 |
| 7,090,166 B2 * | 8/2006 | Dennis et al. | | 244/63 |
| 7,111,807 B2 * | 9/2006 | Lipponen | | 244/63 |
| 7,128,294 B2 * | 10/2006 | Roeseler et al. | | 244/49 |
| 7,140,575 B2 * | 11/2006 | McGeer et al. | | 244/63 |
| 7,143,974 B2 * | 12/2006 | Roeseler et al. | | 244/63 |
| 7,165,745 B2 * | 1/2007 | McGeer et al. | | 244/63 |
| 7,210,654 B1 * | 5/2007 | Cox et al. | | 244/63 |
| 7,232,092 B2 * | 6/2007 | Yamamoto | | 244/63 |
| 7,360,741 B2 * | 4/2008 | McGeer et al. | | 244/63 |
| 7,562,843 B2 * | 7/2009 | Lipponen | | 244/63 |
| 7,594,624 B2 * | 9/2009 | Yamamoto | | 244/63 |
| 7,712,702 B2 * | 5/2010 | McGeer et al. | | 244/63 |
| 7,954,755 B2 * | 6/2011 | Lipponen | | 244/63 |
| 8,028,521 B2 * | 10/2011 | Boeijen et al. | | 60/486 |
| 2003/0116677 A1 * | 6/2003 | Young et al. | | 244/63 |
| 2005/0151009 A1 * | 7/2005 | Roeseler et al. | | 244/63 |
| 2005/0178894 A1 * | 8/2005 | McGeer et al. | | 244/63 |
| 2005/0178895 A1 * | 8/2005 | McGeer et al. | | 244/63 |
| 2005/0230533 A1 * | 10/2005 | Lipponen | | 244/63 |
| 2006/0038067 A1 * | 2/2006 | Dennis | | 244/63 |
| 2006/0151667 A1 * | 7/2006 | Dennis et al. | | 244/63 |
| 2006/0186266 A1 * | 8/2006 | Kennedy | | 244/63 |
| 2007/0075185 A1 * | 4/2007 | McGeer et al. | | 244/63 |
| 2007/0084965 A1 * | 4/2007 | Lipponen | | 244/63 |
| 2007/0252034 A1 * | 11/2007 | McGeer et al. | | 244/63 |
| 2008/0087764 A1 * | 4/2008 | Yamamoto | | 244/63 |
| 2009/0250550 A1 * | 10/2009 | Lipponen | | 244/63 |
| 2011/0147516 A1 * | 6/2011 | Hu et al. | | 244/63 |
| 2012/0012695 A1 * | 1/2012 | Robinson | | 244/63 |

* cited by examiner

SLIDING FRAME AIRCRAFT LAUNCHER

CROSS-REFERENCE TO RELATED APPLICATIONS

The present application claims priority under 35 U.S.C. §119 of U.S. Provisional Application No. 61/106,868 filed on Oct. 20, 2008, the entire content of which is incorporated herein by reference.

BACKGROUND OF THE INVENTION

1. Technical Field

The present invention relates generally to aircraft launchers, and more specifically, to unmanned air vehicle (UAV) launchers.

2. Related Art

Three major types of UAV launchers known in the art are mechanical spring launchers, pneumatic launchers, and hydro-pneumatic launchers. Typically, hydro-pneumatic launchers are the most powerful and compact of known UAV launchers, and as a result, hydro-pneumatic launchers account for the majority of launchers on the market today.

Most known UAV launchers use an inclined rail in conjunction with a system to accelerate the UAV up the rail for launch, such as a shuttle. In many cases, the length of the rail is too large to facilitate tactical transport and mobility of the launcher when in its operative state. Thus, most known UAV launchers are transported in a partially disassembled state, and assembled at the launch site. Accordingly, minimizing the time and complexity of the assembly and disassembly process is typically the subject of most UAV design efforts.

Known UAV launchers are typically large in size. The size of the launchers can create problems in military environments, such as, for example:

(1) When used in shipboard applications, the size of the UAV launcher may exceed the amount of deck space that is available.

(2) The large size of known launchers can make redirection of the launcher (e.g., in response to wind changes) difficult. Sometimes, disassembly and reassembly are required for direction changes, which can require more time and personnel than are available. Consequently, users sometimes launch the UAV in wind conditions that jeopardize the aircraft (e.g., a tail wind).

(3) Protecting a deployed UAV launcher from adverse environmental conditions can be impractical when the launcher is large. This means the launcher design may suffer reliability degradation during weather events such as snow and ice, or environmental issues such as dust and sand. As a result, crews sometimes need to do maintenance, such as removing ice from the rails before the launcher can be used.

UAV launchers using relatively short rails (in contrast to the large launchers discussed above) can have setbacks as well. UAV launchers with short rails typically impart large launching loads over the short span of the rails. As a result, the UAV may need to be reinforced to survive these loads, which can increase the weight of the UAV. The increased weight of the UAV may have undesirable effects on it, for example, it may reduce the endurance of the UAV.

SUMMARY

According to an illustrative embodiment of the present invention, an aircraft launcher can comprise a base frame; a first sliding frame that slides with respect to the base frame; a second sliding frame that slides with respect to the first sliding frame; an aircraft support located on the second sliding frame; and a drive apparatus adapted to slide at least one of the first sliding frame and the second sliding frame with respect to the base frame. According to an illustrative embodiment, the first sliding frame can slide along a first axis, and the second sliding frame can slide along a second axis substantially parallel to the first axis.

According to an illustrative embodiment, the aircraft launcher can further include a timing apparatus that coordinates sliding of the first sliding frame and the second sliding frame with respect to the base frame. The drive apparatus can impart movement to the first sliding frame with respect to the base frame, and the timing apparatus can impart movement to the second sliding frame with respect to the base frame. For example, the timing apparatus can comprise a belt coupled to the base frame, the first sliding frame, and the second sliding frame.

According to an illustrative embodiment, the drive apparatus can comprise an actuator that imparts movement to at least one of the first sliding frame and the second sliding frame with respect to the base frame. The actuator can comprise a linear actuator. The actuator can be coupled to at least one of the first sliding frame and the second sliding frame via a pulley system.

According to an illustrative embodiment, the aircraft launcher can further comprise a hydraulic circuit that powers the actuator. According to another illustrative embodiment, the aircraft launcher can further comprise an arresting apparatus that decelerates or stops movement of the first sliding frame and the second sliding frame with respect to the base frame. The arresting apparatus can comprise a belt coupled to at least one of the first sliding frame and the second sliding frame. The arresting apparatus can further comprise an elastic member coupled to the belt.

According to an illustrative embodiment, the aircraft support can comprise a cradle including a first pivot arm adapted to pivot into engagement with a first side of an aircraft, and a second pivot arm adapted to pivot into engagement with a second, opposite side of the aircraft. The aircraft launcher can further comprise a first shear member adapted to hold the first pivot arm in engagement with the first side of the aircraft; and a second shear member adapted to hold the second pivot arm in engagement with the second side of the aircraft; wherein at least one of the first shear member or the second shear member shears when the aircraft separates from the cradle during launch.

According to an illustrative embodiment, the aircraft launcher can further comprise a first anti-friction slide located between the base frame and the first sliding frame; and a second anti-friction slide located between the first sliding frame and the second sliding frame. Alternatively, the aircraft launcher can further comprise at least one roller bearing located between the base frame and the second sliding frame.

The present invention also relates to a method of launching an aircraft. According to an illustrative embodiment, the method can comprise retracting a first sliding frame with respect to a base frame in a first direction; retracting a second sliding frame with respect to the first sliding frame in the first direction, the second sliding frame supporting an aircraft; extending the first sliding frame with respect to the base frame in a second direction opposite to the first direction; and extending the second sliding frame with respect to the first sliding frame in the second direction, thereby launching the aircraft from the second sliding frame.

According to an illustrative embodiment, extending the first sliding frame with respect to the base frame in the second direction can comprise activating an actuator that imparts movement to the first sliding frame with respect to the base frame. Extending the second sliding frame with respect to the first sliding frame in the second direction can comprise moving a timing apparatus coupled to the base frame and at least one of the first sliding frame and the second sliding frame.

According to an illustrative embodiment, the method can further comprise arresting movement of the first sliding frame and the second sliding frame in the second direction in order to launch the aircraft from the second sliding frame. After launching the aircraft from the second sliding frame, an illustrative embodiment can comprise retracting the first sliding frame and the second sliding frame in the first direction into a storage position. When in the storage position, the base frame, the first sliding frame, and the second sliding frame can substantially completely overlap one another.

According to an illustrative embodiment, extending the first sliding frame with respect to the base frame in the second direction, and extending the second sliding frame with respect to the first sliding frame in the second direction comprise activating a switch on a hand-held control unit.

According to an illustrative embodiment of the present invention, the aircraft launcher can comprise a base frame; a sliding frame that slides with respect to the base frame, the sliding frame defining a longitudinal length; an aircraft support located on the sliding frame; and a drive apparatus adapted to slide the sliding frame with respect to the base frame between a fully retracted position and a fully extended position; wherein about one-half or less of the longitudinal length of the sliding frame overlaps the base frame when in the fully retracted position, and about one-half or less of the longitudinal length of the sliding frame overlaps the base frame when in the fully extended position.

BRIEF DESCRIPTION OF THE DRAWINGS

The foregoing and other features and advantages of the invention will be apparent from the following drawings wherein like reference numbers generally indicate identical, functionally similar, and/or structurally similar elements.

DETAILED DESCRIPTION OF INVENTION

The present invention relates to an aircraft launcher and related method. For illustrative, non-limiting purposes, the aircraft launcher and related method will be described in the context of an unmanned air vehicle (UAV) launcher. An example of an UAV that can be launched with the present invention is an Aerosonde 470 made by Aerosonde, which is located at Unit 1, 585 Blackburn Road, Notting Hill, Victoria, Australia, 3168. One of ordinary skill in the art will appreciate, however, that the UAV launcher of the present invention can be used with other types and sizes of UAVs.

According to an illustrative embodiment, the UAV launcher can be quick and easy to use, and can require little or no assembly at the launch site. According to an illustrative embodiment, the UAV launcher can be compact, allowing it to be easily stored in a transport position when not in use. For example, an illustrative embodiment can be as small as seven feet long by eighteen inches wide, by sixteen inches deep. According to another illustrative embodiment, the launcher may be seven feet long by twenty-nine inches wide, by thirty-two inches deep. The compact size can facilitate protection of the UAV launcher between launches, for example, by allowing a transport cover to be installed over the UAV launcher. Additionally, an illustrative UAV launcher according to the present invention can provide for a "soft launch" of the UAV, where acceleration forces on the UAV are reduced. Further, an illustrative UAV launcher according to the present invention can have a high power-to-weight ratio, and/or can be of low cost construction.

Figure 1:
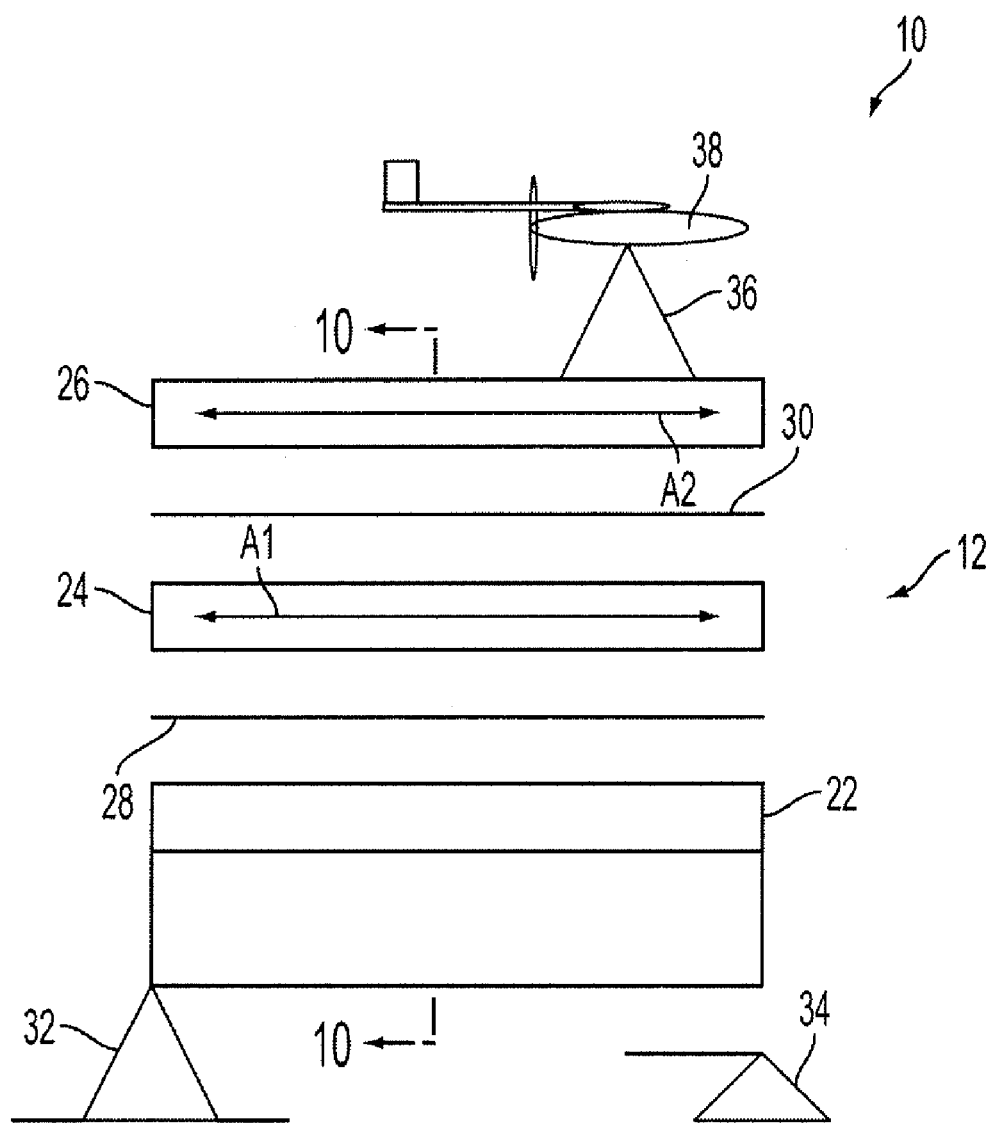
FIG. 1 is a side, partially exploded view of an illustrative UAV launcher according to the present invention.

An illustrative UAV launcher according to the present invention is shown in FIG. 1. The UAV launcher 10 can comprise a sliding frame 12, shown in FIG. 1, which can have a generally ladder-like framework configuration, however, other configurations are possible. According to an illustrative embodiment, the sliding frame 12 can move between a "start-launch" position (shown in the left-hand side of FIG. 2) and an "aircraft separation" position (shown in the right-hand side of FIG. 2). The UAV launcher 10 can further include a frame timing system 14, shown in FIG. 3, and a drive system 16, shown in FIG. 4. The UAV launcher 10 can additionally include a hydraulic circuit 18 for the drive system 16, shown in FIG. 5, as well as an arresting system 20, shown in FIG. 6.

Referring to FIG. 1, the UAV launcher 10 can include a base frame 22 that can rest on the ground or on a transport surface, such as the bed of a truck. The UAV launcher 10 can also include a first sliding frame 24 and a second sliding frame 26, which can slide with respect to the base frame 22. For illustrative purposes, the base frame 22, first sliding frame 24, and second sliding frame 26 are shown separated from one another in FIG. 1, however, in application, these members can be coupled to one another, for example, by a first anti-friction slide 28 and a second anti-friction slide 30, however, other configurations are possible. The UAV launcher 10 is illustrated in FIG. 1 as having two sliding frames 24, 26, however, alternative embodiments can have a single sliding frame, or more than two sliding frames. In illustrative embodiments where only one sliding frame is used, the timing system 14 may be omitted. In illustrative embodiments having three or more sliding frames, multiple timing systems 14 may be used.

Still referring to FIG. 1, an illustrative embodiment can include a pivot 32, such as an aft incline pivot, that can be used to adjust the vertical trajectory of the UAV launcher 10. An incline link 34, or other structure, can be used in conjunction with the pivot 32 to lock-in the vertical trajectory. According to an illustrative embodiment, the pivot 32 and incline link 34 can be used to position the UAV launcher 10 at an inclination of between about 10 and about 25 degrees with respect to the ground, and preferably between about 11 and about 13 degrees, however, other trajectories are possible. Although not shown, an alternative embodiment of the UAV launcher 10 can pivot near it's front end in order to allow the launcher 10 to pivot forward to reduce loads during deceleration of the sliding frame 12 (e.g., during operation of the arresting system).

Referring to FIG. 1, the first sliding frame 24 can slide with respect to the base frame 22 along a first axis A1. The second sliding frame 26 can slide with respect to the first sliding 24 frame along a second axis A2. An aircraft support 36, such as an aircraft cradle, can be located on the second sliding frame 26 to support an aircraft 38, such as an UAV, on the UAV launcher 10. According to the illustrative embodiment shown in FIG. 1, the drive system 16 and/or hydraulic circuit 18 can be housed within the base frame 22, or mounted on or near the base frame 22.

As shown in FIG. 1, the first axis A1 and the second axis A2 can be substantially parallel to one another, such that the first sliding frame 24 and second sliding frame 26 move with respect to one another in a telescoping manner. Although the base frame 22, first sliding frame 24, and second sliding frame 26 are shown as being stacked on top of one another in the vertical direction, these components can alternatively partially overlap with one another in the vertical direction (as shown, for example, in FIG. 10), or alternatively, can be arranged concentrically with respect to one another (e.g., completely nest within one another).

Figure 2:
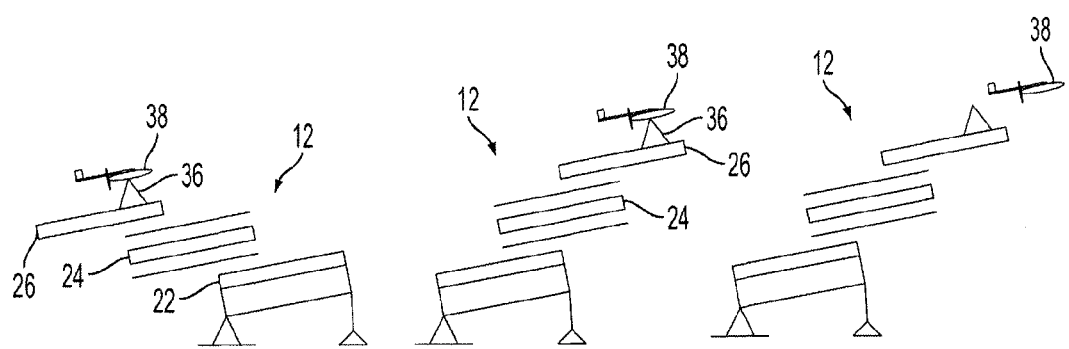
FIG. 2 is a side, partially exploded view of an illustrative UAV launch sequence according to the present invention.

FIG. 2 depicts an illustrative launch sequence according to the present invention. The UAV launcher 10 is shown in an illustrative "start launch" position on the left-hand side of FIG. 2. In this position, the first sliding frame 24 and the second sliding frame 26 have been fully retracted with respect to the base frame 22 along the first axis and second axis, respectively. An aircraft, such as an UAV 38, can be supported on the aircraft cradle 36, and is ready to launch. The center of FIG. 2 shows the UAV launcher in an illustrative "aircraft separation" position, where the first sliding frame 24 and the second sliding frame 26 have substantially fully extended, e.g., reached full stroke in the forward direction, and the UAV 38 begins separation from the aircraft cradle 36. The right-hand side FIG. 2 shows the UAV launcher 10 in an illustrative "finish launch" position, where the UAV 38 has completely separated from the UAV launcher 10, and is in flight.

Figure 3:
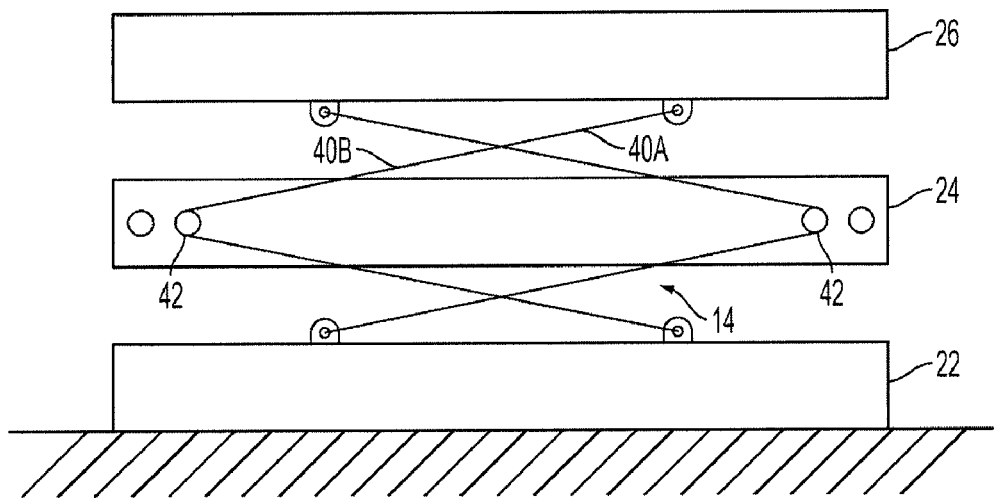
FIG. 3 is a side, partially exploded view of an illustrative timing system for the UAV launcher of FIG. 1.
Figure 7:
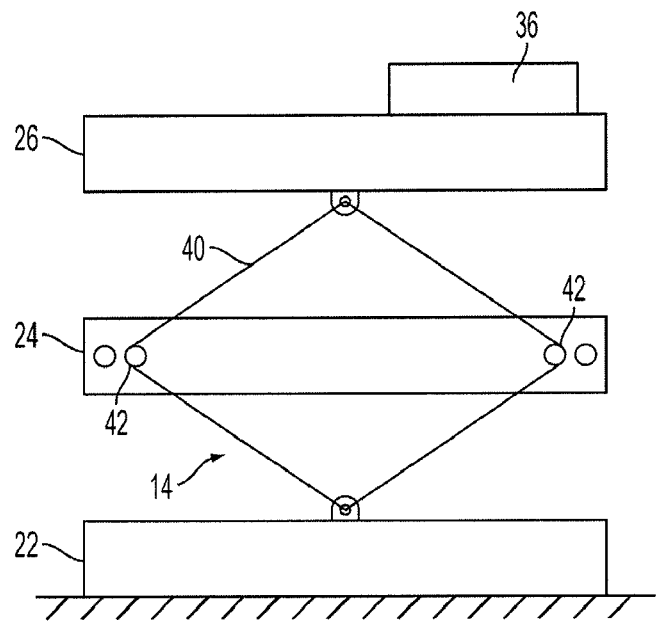
FIG. 7 is a side, partially exploded view of an illustrative timing system according to an alternative embodiment of the present invention.

FIG. 3 depicts an illustrative timing system 14 for the first sliding frame 24 and the second sliding frame 26. FIG. 3 is a partially-exploded view in order to better illustrate the timing system 14. The timing system 14 can coordinate sliding of the first sliding frame 24 and the second sliding frame 26 with respect to the base frame 22. For example, the timing system 14 can comprise a first belt 40A and a second belt 40B, each coupled to the base frame 22, the first sliding frame 24, and the second sliding frame 26. The term "belt" is used generically throughout this application to include belts, timing belts, cables, ropes, chains, or other similar structures known in the art. In the illustrative embodiment shown, the belts 40A, 40B are anchored to the base frame 22 and the second sliding frame 26, and coupled to the first sliding frame 24 by, for example, rollers 42, however, other configurations are possible. The belts 40A, 40B can coordinate movement between the first sliding frame 24 and the second sliding frame 26, such that retraction (i.e., movement to the left in FIG. 3) of the first sliding frame 24 imparts similar movement in the same direction to the second sliding frame 26, or vice versa. Likewise, extension (i.e., movement to the right in FIG. 3) of the first sliding frame 24 can impart similar movement in the same direction to the second sliding frame 26, or vice versa. Due to the arrangement of the belts 40A, 40B, the first sliding frame 24 may move one half the velocity of the second sliding frame 26, however, other configurations are possible. The timing system 14 can include tensioners to minimize slack in the belts. FIG. 7 is an alternative embodiment of the timing system of FIG. 3, comprising a single belt 40 anchored to the base frame 22 and second sliding frame 26 in a single location. The belt 40 of FIG. 7 can alternatively comprise two or more belts joined together where anchored to the base frame 22 and second sliding frame 26. According to an illustrative embodiment, the timing system 14 may include two or more sets of belts located in parallel to one another (e.g., on opposite lateral sides of the UAV launcher 10) to balance the loads on the launcher.

Figure 4:
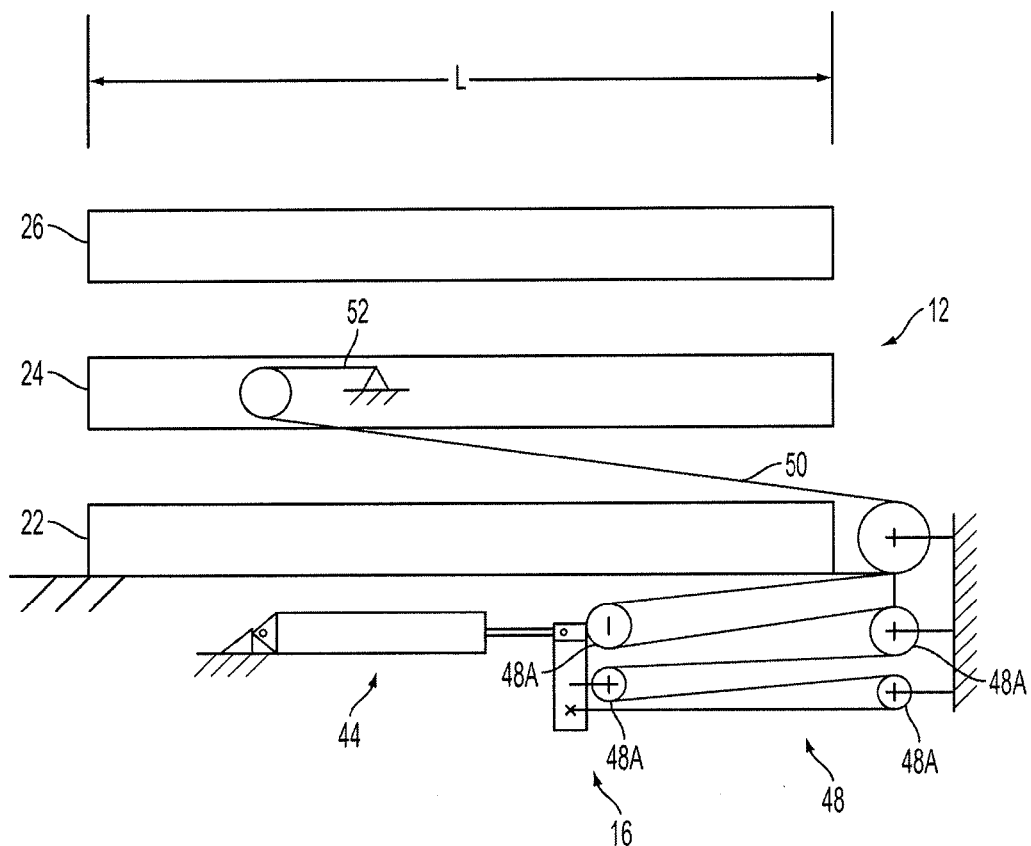
FIG. 4 is a side, partially exploded view of an illustrative drive system for the UAV launcher of FIG. 1.

FIG. 4 depicts an illustrative drive system 16 for the UAV launcher 10 of the present invention. The drive system 16 can include a linear actuator 44, such as a cylinder, however other configurations are possible. The linear actuator 44 can be attached to a pulley system 48 (which includes a plurality of pulleys 48A), which in the illustrative embodiment shown, magnifies the stroke of the linear actuator 44 by five times, however, other configurations are possible. The drive system 16 can be anchored with respect to the UAV launcher 10 (e.g., mounted in, on, or near the base frame), and the pulley 50 can have it's distal end 52 attached to one of the sliding frame members 24, 26, such as the first sliding frame member 24, as shown.

FIG. 4 depicts the UAV launcher 10 in a storage position, in which the base frame 22, first sliding frame 24, and second sliding frame 26 substantially completely overlap one-another in the length-wise direction, resulting in at least the sliding frame 12 component of the UAV launcher 10 having a compact overall length L. The UAV launcher 10 may be located in the storage position prior to being setup for launch, or after completing a launch. From the storage position, retraction of the first and second sliding members 24, 26 to a start launch position can cause the belt 50 to unwind from the pulley system 48, and hence can extend the linear actuator 44. Retracting the linear actuator 44 can cause the belt 50 to retract into the pulley system 48, and hence, can cause the first sliding frame 24 to extend (i.e., move to the right in FIG. 4). The timing system 14, described above, and shown in FIGS. 3 and 7, can cause the second sliding frame 26 to extend as well, thus causing the UAV launcher 10 to launch the aircraft.

Figure 5:
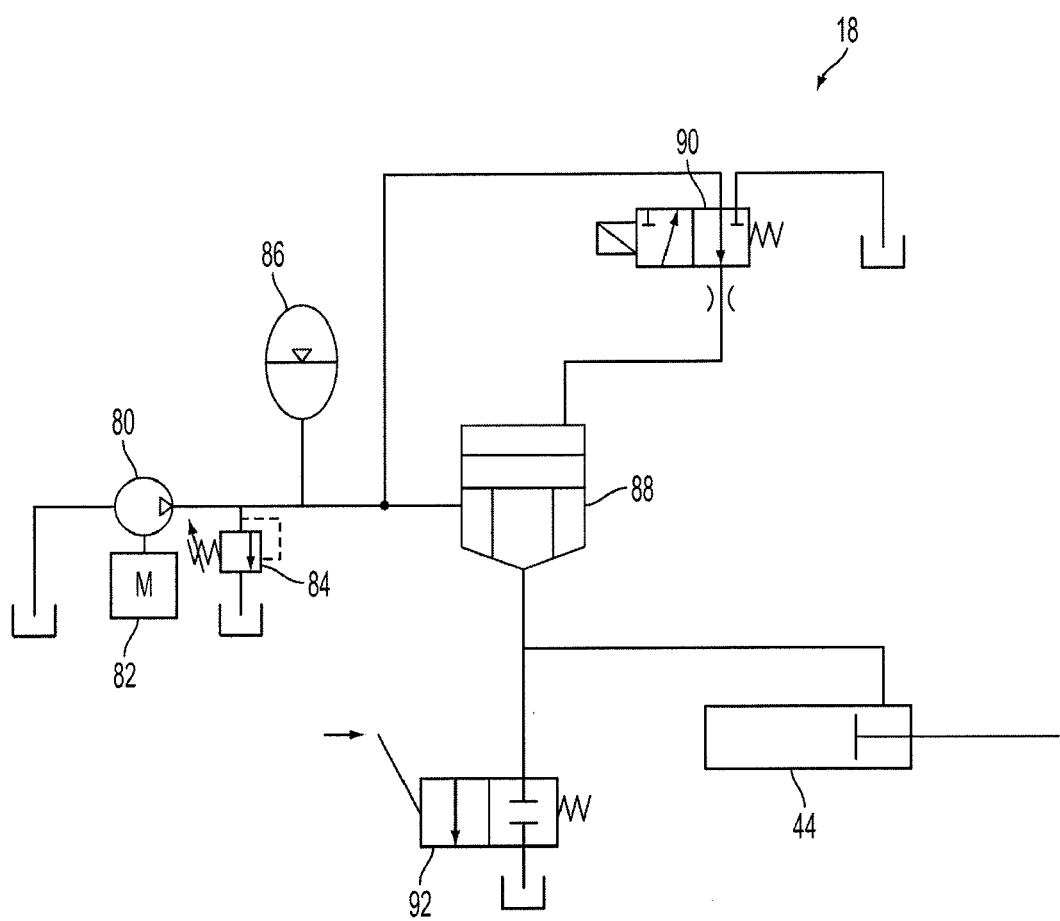
FIG. 5 is a schematic representation of an illustrative hydraulic circuit for the illustrative drive system of FIG. 4.

FIG. 5 will be discussed below with reference to FIG. 19.

Figure 6:
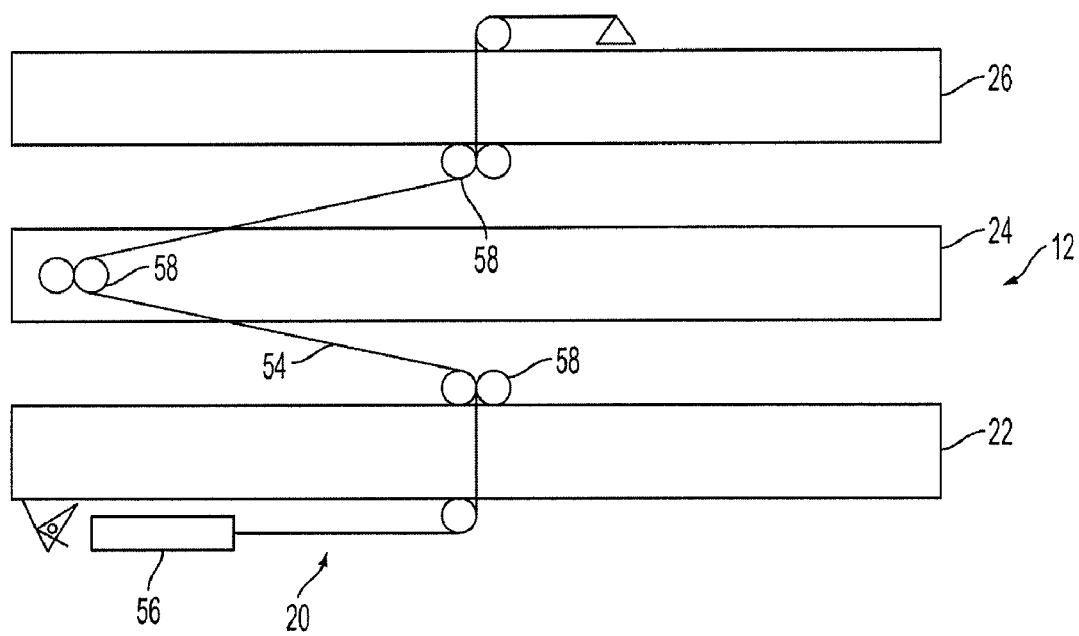
FIG. 6 is a side, partially exploded view of an illustrative arresting system for the UAV launcher of FIG. 1.
Figure 15:
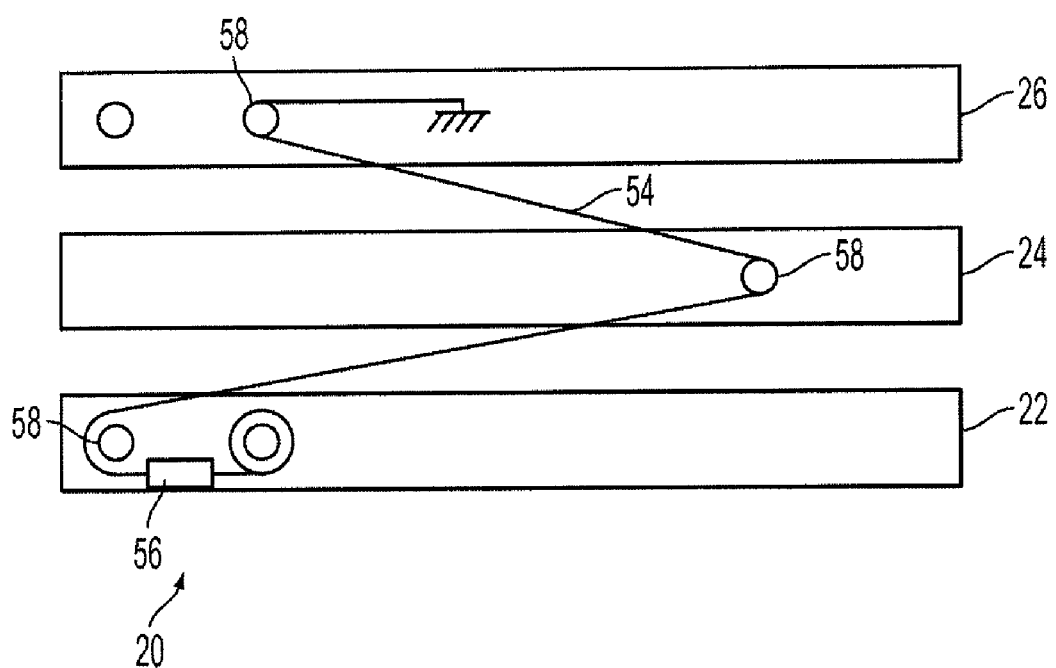
FIG. 15 is a side, partially exploded view of an illustrative arresting system according to an alternative embodiment of the present invention.

FIG. 6 depicts an illustrative arresting system 20 for the UAV launcher 10 of the present invention. According to an illustrative embodiment, the arresting system 20 can stop movement of the sliding frame 12 (e.g., first and second sliding frames 24, 26) at or around the time of launch. This can prevent shock to the UAV 38 and/or the UAV launcher 10 when the sliding frame 12 reaches full mechanical extension. The arresting system 20 can comprise a belt 54, such as a nylon strap, composite cable, or synthetic rope connected to an elastic tensioning device 56, such as a ratchet, spring or gas damper. The belt 54 can pass through rollers 58 located on the base frame 22, the first sliding frame 24, and/or the second sliding frame 26, and can be anchored to the second sliding frame 26. The length of the belt 54 and the stroke of the tensioner 56 can be adapted to decelerate (or stop) the first and/or second sliding frames 24, 26 at or around the time of the UAV launch, in order to dampen shock to the UAV and/or the UAV launcher 10. According to an alternative embodiment, not described further, the drive system 16 can be used as an arresting system. FIG. 15 depicts an alternative embodiment of the arresting system 20 of the present invention, in which the belt 54 is routed in a different manner via the pulleys 58. The arresting system 20 can alternatively comprise two or more belts 54 and tensioning devices 56 arranged in parallel. According to an illustrative embodiment, the arresting system 20 can stop movement of the second sliding frame 26, and the timing system 14 can in turn stop movement of the first sliding frame 24, however, other configurations are possible.

Figure 11:
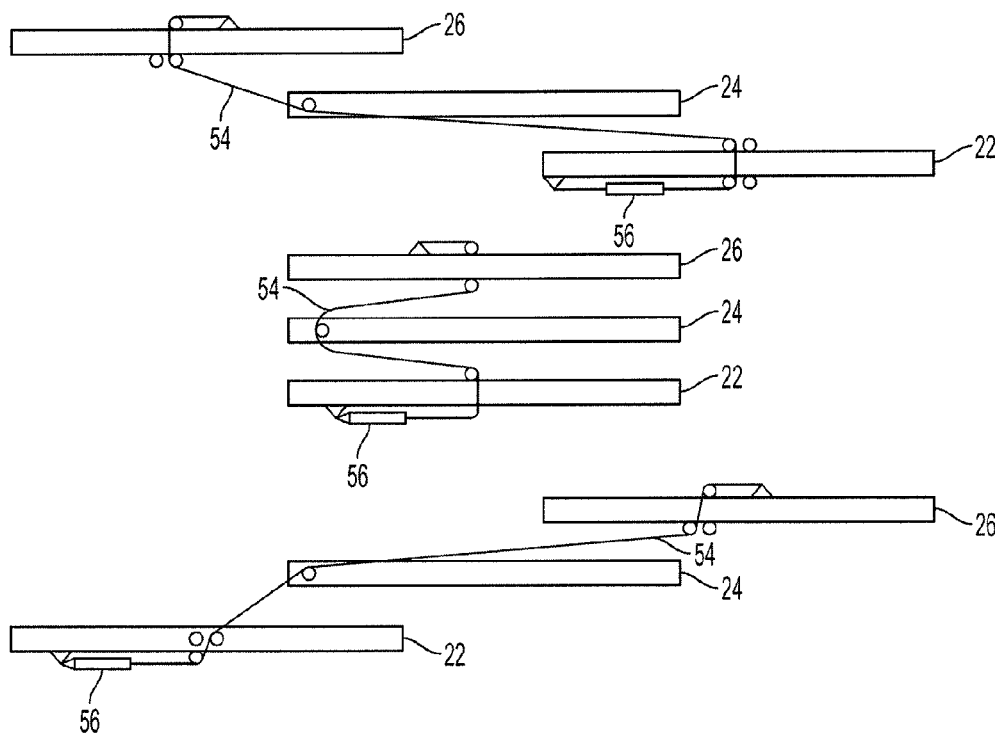
FIG. 11 is a side, partially exploded view illustrating the operation of the illustrative arresting system of FIG. 6.

FIG. 11 depicts an illustrative operation of the arresting system 20 of FIG. 6. The top of FIG. 11 shows the position of the belt 54 when the UAV launcher 10 is in the fully retracted, or "start launch" position. The middle of FIG. 11 shows the position of the belt 54 when the UAV launcher 10 is between the fully retracted position and a fully extended position, or "aircraft separation" position. The bottom of FIG. 11 shows the position of the belt 54 at or around the "aircraft separation" position. At or around this point, the belt 54 applies a tension force to the tensioner 56, which acts to dampen the forces of the belt 54, and accordingly, softly decelerate the UAV launcher. As a result, the arresting system 20 can prevent excessive shock forces to the UAV and/or the UAV launcher.

Figure 8:
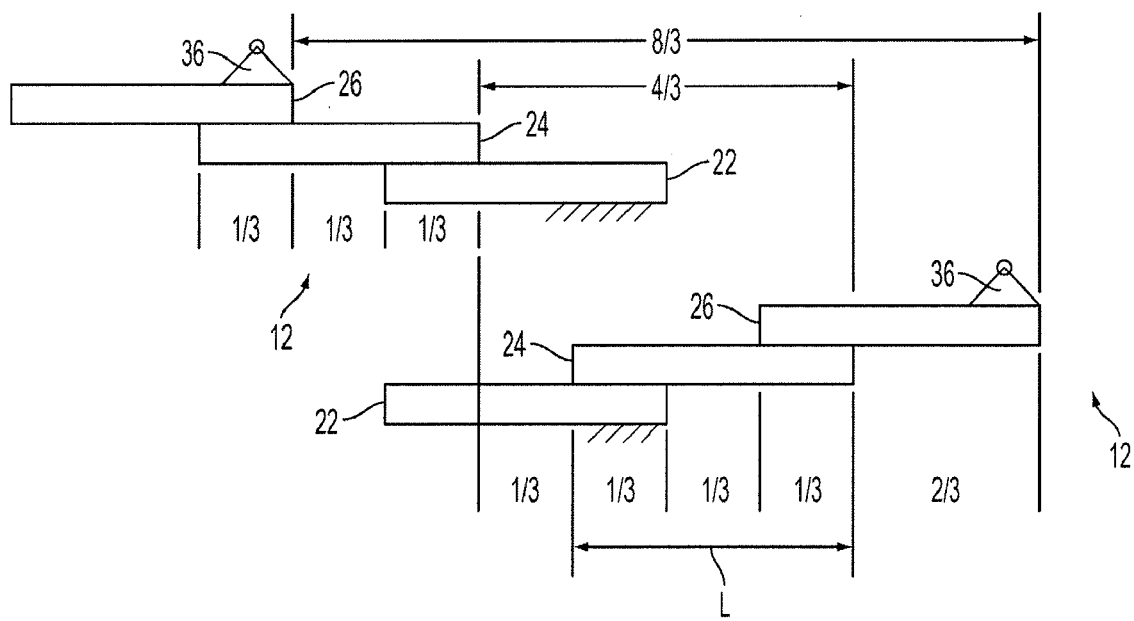
FIG. 8 is a side view showing the stroke of an illustrative UAV launcher according to the present invention.

FIG. 8 depicts the stroke for an illustrative embodiment of a UAV launcher 10 having two sliding frames according to the present application. The illustrative embodiment of FIG. 8 shows the first sliding frame 24 overlapping the base frame 22 by approximately ⅓ of its length when in the retracted and extended positions, and the second sliding frame 26 overlapping the first sliding frame 24 by the same amount when in the retracted and extended positions. Based on this illustrative configuration, the UAV launcher 10 can have a total stroke (e.g., from the "start-launch position" to the "aircraft separation" position) of approximately 2.67 times the length of the sliding frame 12 when in the stored position. This ratio can be altered, for example, by adjusting the amount of overlap between frame members when in the extended and retracted positions, or by adding additional sliding frame members. For example, an illustrative embodiment may have a single sliding frame 24 that overlaps the base frame 22 by one-half or less of it's longitudinal length when in both the retracted and extended positions. FIG. 8 shows the sliding frame 24 having a longitudinal length L that is overlapping the base frame 22 by approximately one-third of length L.

Figure 9:
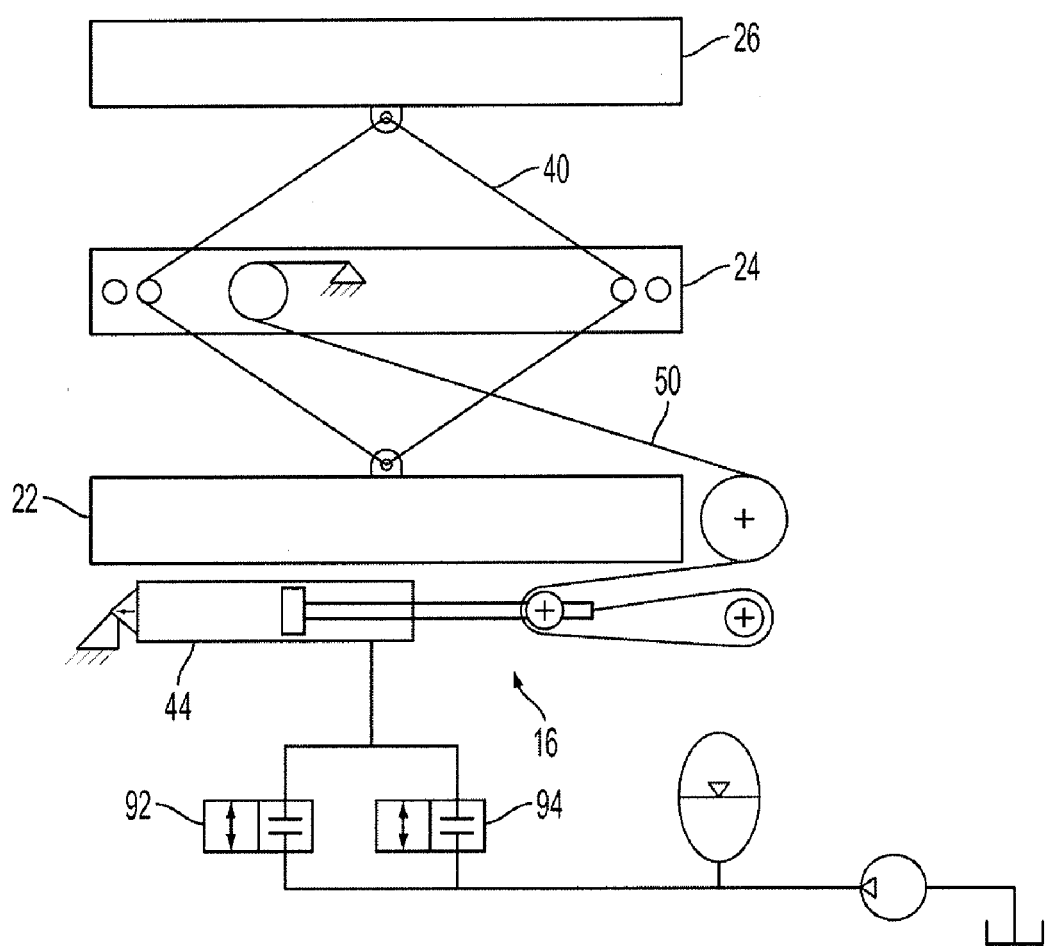
FIG. 9 is a side, partially exploded view of an illustrative drive system according to an alternative embodiment of the present invention.

FIG. 9 will be discussed below with reference to FIG. 19.

Figure 10:
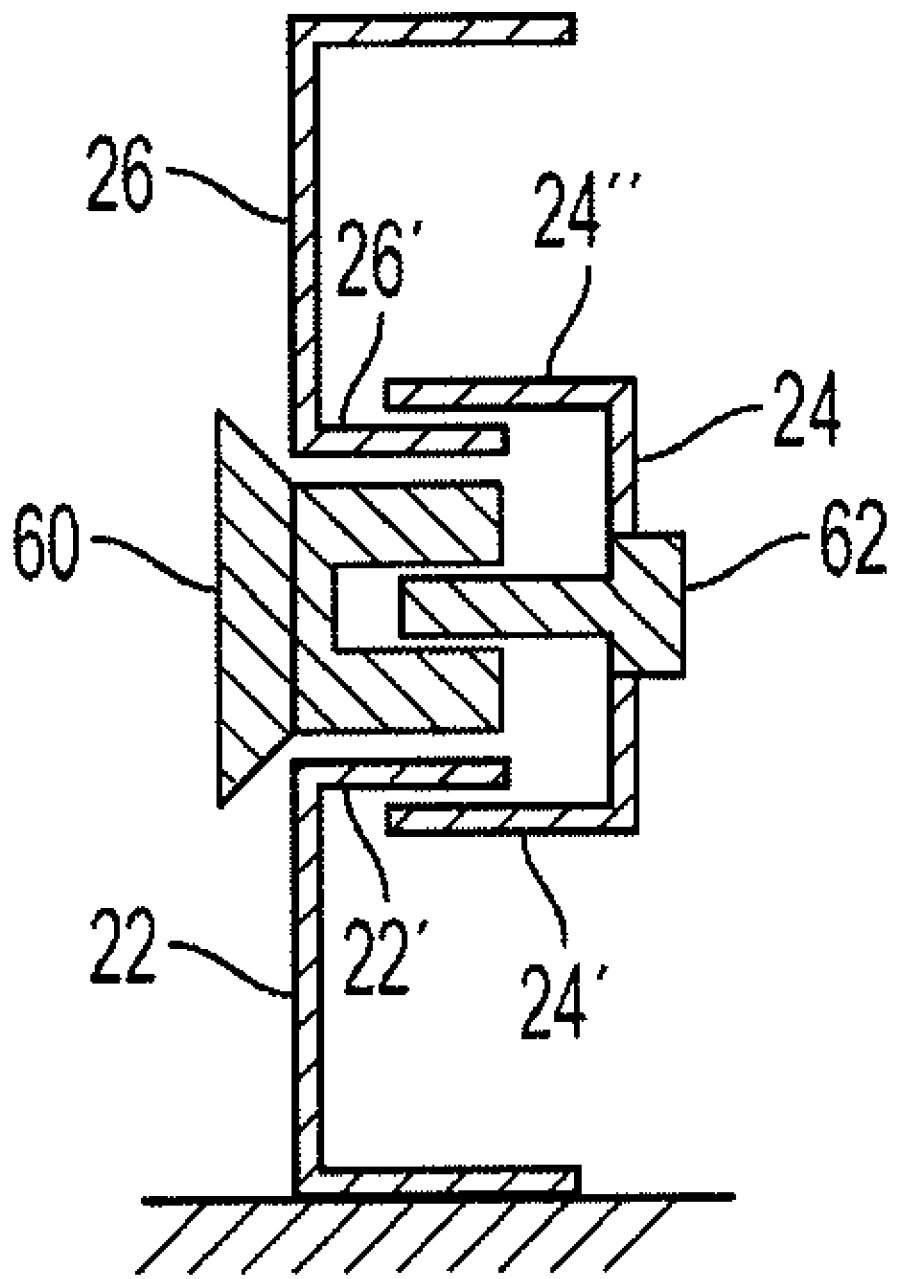
FIG. 10 is a cross-sectional view of the base frame, first sliding frame, and second sliding frame of an illustrative UAV launcher according to the present invention, taken along lines 10-10 of FIG. 1.

FIG. 10 depicts an exemplary cross-sectional view of an illustrative base frame 22, first sliding frame 24, and second sliding frame 26 of the present invention. The cross-section is taken along line 10-10 of FIG. 1. As shown in FIG. 10, the base frame 22, first sliding frame 24, and the second sliding frame 26 can overlap one another, for example, their adjacent side rails can nest within one another. For example, in the illustrative embodiment shown, the upper flange 22' of the base frame can be in overlapping engagement with the lower flange 24' of the first sliding frame 24, and the lower flange 26' of the second sliding frame 26 can be in overlapping engagement with the upper flange 24" of the first sliding frame 24, however, other configurations are possible. A roller 60, as shown in FIG. 10, or other apparatus can be located between the lower flange 26' of the second sliding frame 26 and the upper flange 22' of the base frame 22 to reduce friction, however, other friction reducing mechanisms are also possible, such as a linear bearing, nylon slide, or low-friction coating. The roller 60 can be secured in position on the first sliding frame 24, for example, by a fastener 62, bearing (not shown), or other structure. According to an alternative embodiment, the roller 60 can be replaced with a linear bearings, for example, a first linear bearing sandwiched between the base frame 22 and the first sliding frame 24, and a second linear bearing sandwiched between the first sliding frame 24 and the second sliding frame 26.

Figure 12:
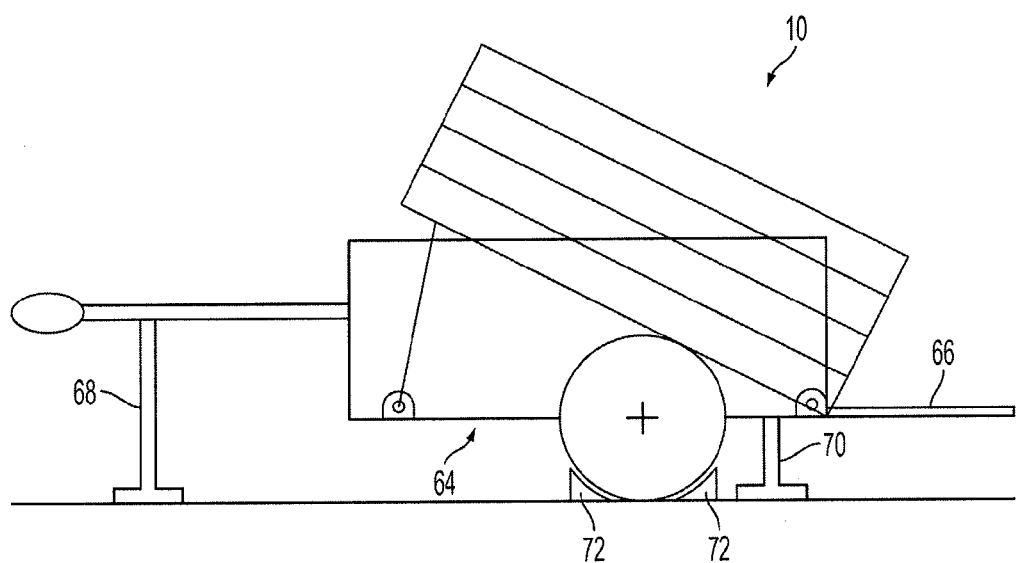
FIG. 12 is a side view of an illustrative trailer containing an illustrative UAV launcher according to the present invention.

FIG. 12 depicts an illustrative embodiment of a UAV launcher 10 according to the present invention in a storage position, located in a trailer 64 to facilitate transportation of the UAV launcher 10. Tie downs or other types of anchors may be used to hold the UAV launcher in a desired position, for example, during transportation, or during launch. The trailer 64 can include a hinged rear ramp 66. The trailer 64 can further include a forward screw jack 68, located, for example, on the trailer tongue, and/or one or more rearward screw jacks 70 which can be located towards the rear of the trailer 64. The screw jacks 68, 70 can rest on the ground to provide stability to the trailer 64, for example, during launch. Wheel chocks 72 can be used to further stabilize the trailer 64.

Figure 13A:
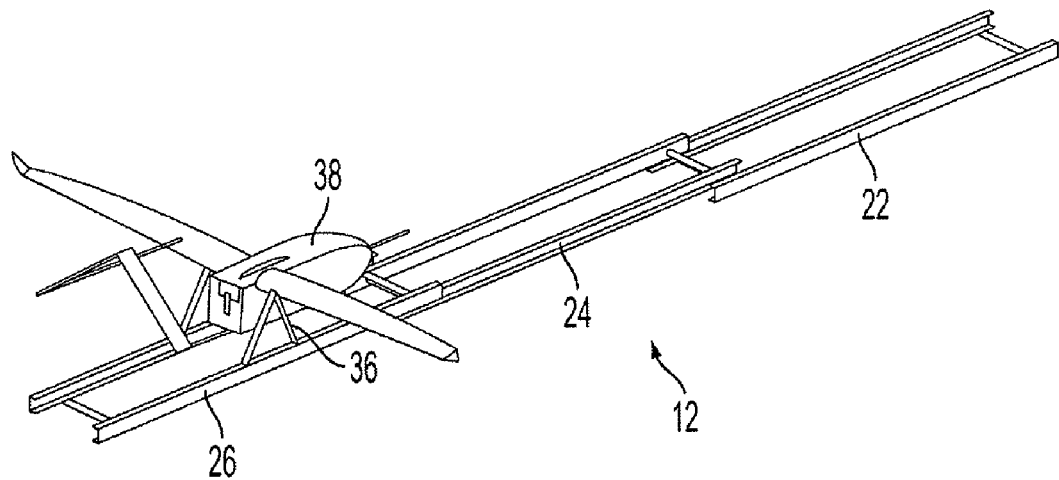
FIGS. 13A-F are perspective views depicting an illustrative UAV launch sequence according to the present invention.
Figure 13B:
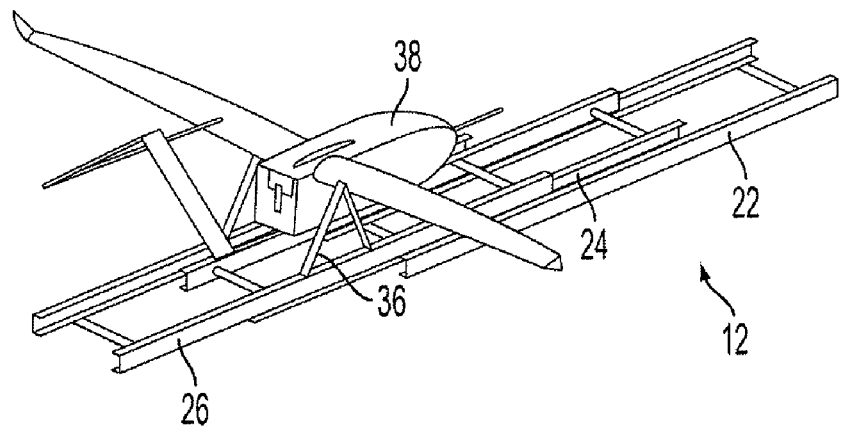
Figure 13C:
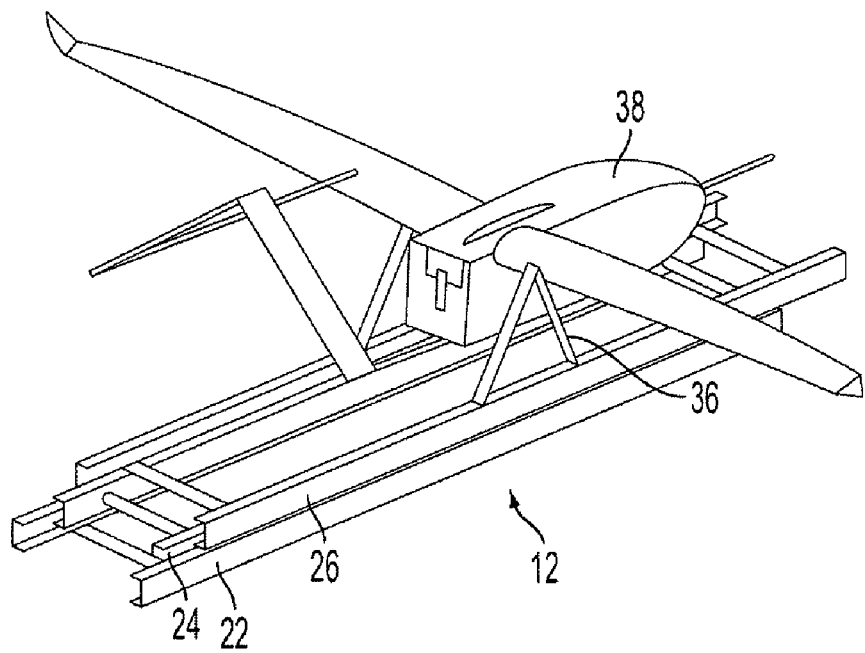
Figure 13D:
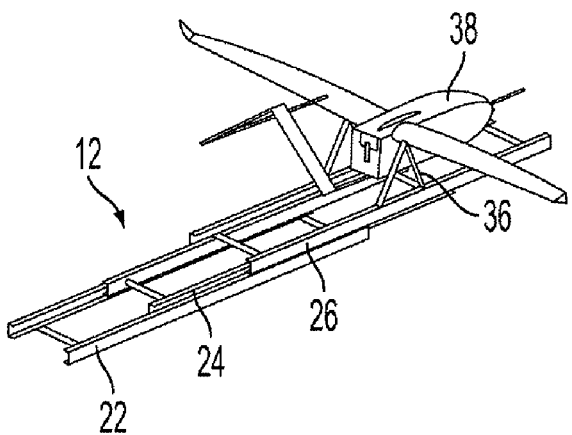
Figure 13E:
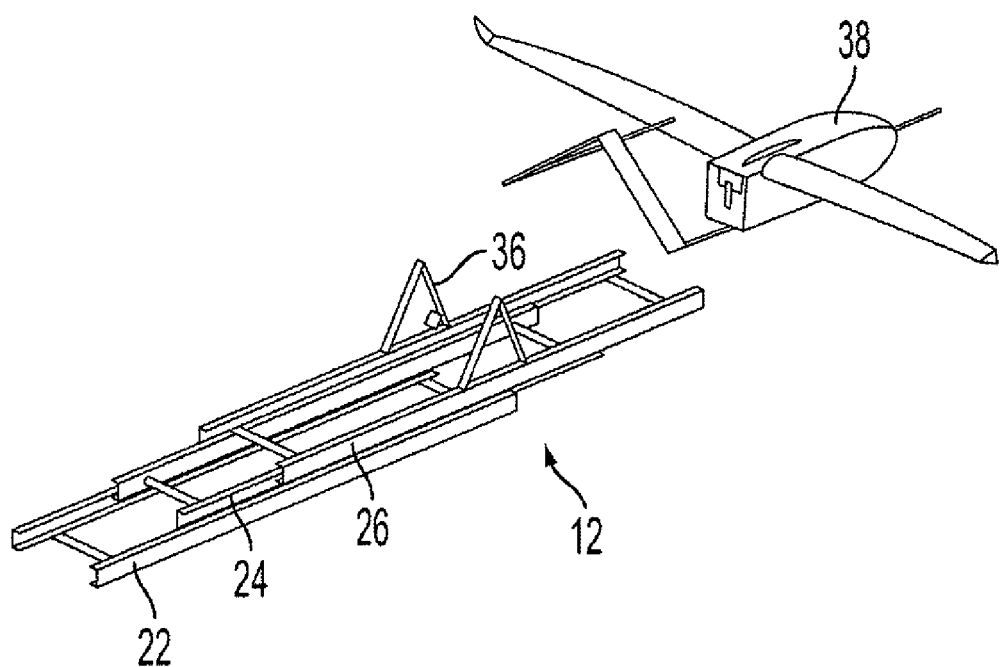
Figure 13F:
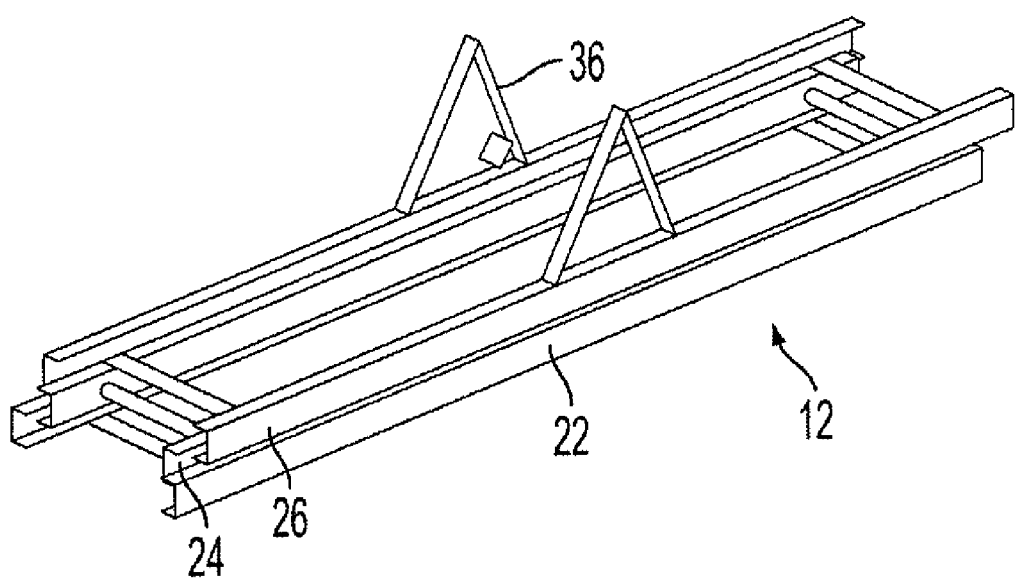

FIGS. 13A-13F depict an illustrative UAV launch sequence according to the present invention. The sequence begins in FIG. 13A with the sliding frame 12 in a fully retracted, or "start launch" position. FIGS. 13B-13D depict the sliding frame 12 moving toward the "aircraft separation" position, where the UAV 38 begins to separate from the launcher. FIG. 13E depicts the sliding frame 12 in a "finish launch" position shortly after takeoff. FIG. 13F depicts the sliding frame 12 after it has been returned to the storage position, which can be done manually or automatically.

With reference to FIGS. 13A-13F, a method of launching an UAV 38 can comprise retracting the first sliding frame 24 and the second sliding frame 26 in a first, or rearward direction with respect to the base frame 22, for example, to the position shown in FIG. 13A. This can be done manually, for example, or alternatively, through a power source associated with the launcher 10. Referring to FIGS. 13B-D, the method can further comprise extending the first sliding frame 24 and the second sliding frame 26 in a second, or forward direction with respect to the base frame 22, for example, until the sliding frame 12 reaches maximum extension, as shown in FIG. 13D. Substantially immediately thereafter, the UAV 38 may separate from the launcher, for example, as shown in FIG. 13E, at which point, the UAV 38 may be in flight.

Still referring to FIGS. 13A-F, movement of the first sliding frame 24 in the forward direction can be accomplished, for example, by activating a drive system, such as the drive system 16 shown in FIG. 4, to move the first sliding frame 24 with respect to the base frame 22. This can be accomplished, for example, by activating a switch on a hand-held control unit (not shown) that activates the actuator 44 of the drive system 16, however, other methods are possible. According to an illustrative embodiment, the hand-held control unit can control the hydraulic circuit 18 that powers the drive system 16, for example, pressurizes the actuator 44. According to an illustrative embodiment, the hand-held control unit can be connected to the hydraulic circuit 18 using a wireless connection or a cable, for example, a twenty to eighty foot cable, providing usage of the launcher 10 from a safe distance.

Still referring to FIGS. 13A-F, movement of the second sliding frame 26 in the forward direction can be accomplished, for example, via the timing system 14, shown, for example, in FIGS. 3 and 7, which translates movement of the first sliding frame 24 into movement of the second sliding frame 26, however, other methods are possible. At or before the time the sliding frame 12 reaches the "aircraft separation" position, shown, for example, in FIG. 13D, the sliding frame 12 can be decelerated and/or stopped, for example, using an arresting system, such as the illustrative arresting systems 20 shown in FIGS. 6, 11, and 15. After the launch is completed, the sliding frame 12 can be returned to a storage position, shown, for example, in FIG. 13F, where the base frame 22, first sliding frame 24, and second sliding frame 26 substantially completely overlap one another in the lengthwise direction, thereby allowing the launcher 10 to have a compact configuration.

Figure 14:
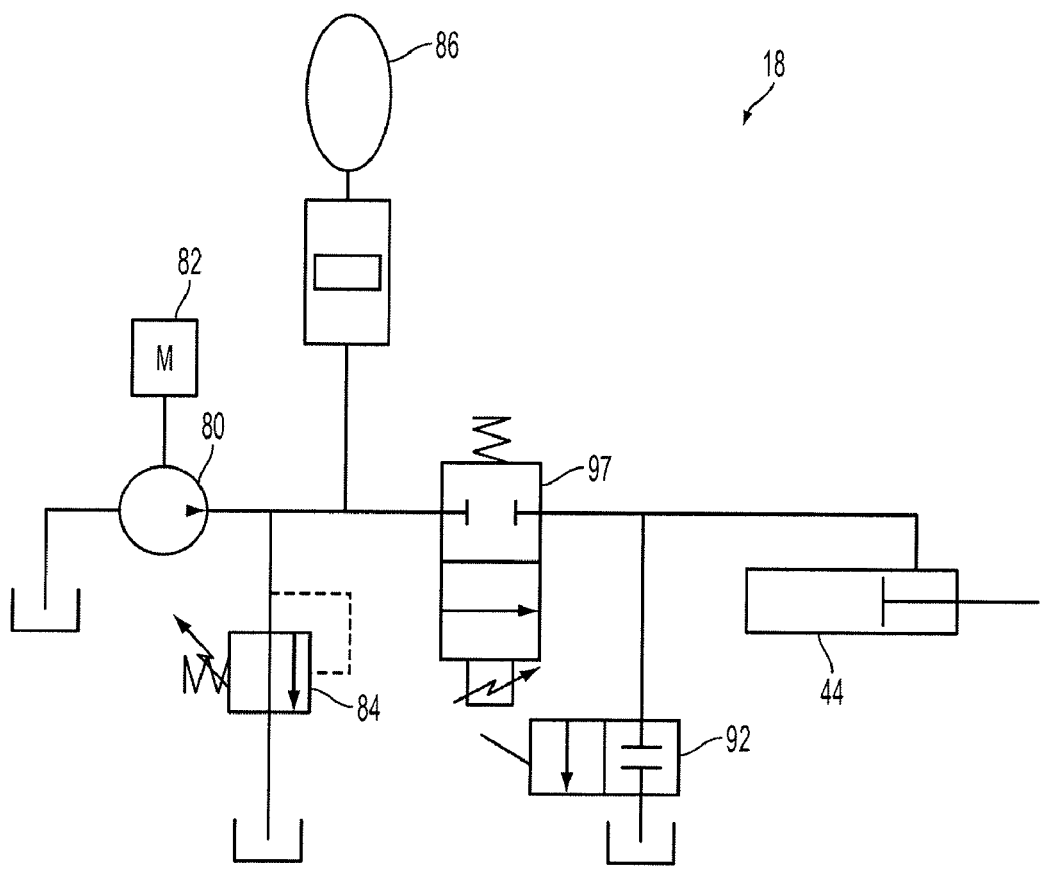
FIG. 14 is a schematic representation of an illustrative hydraulic circuit according to an alternative embodiment of the present invention.

FIG. 14 will be discussed below with reference to FIG. 19.

Figure 16:
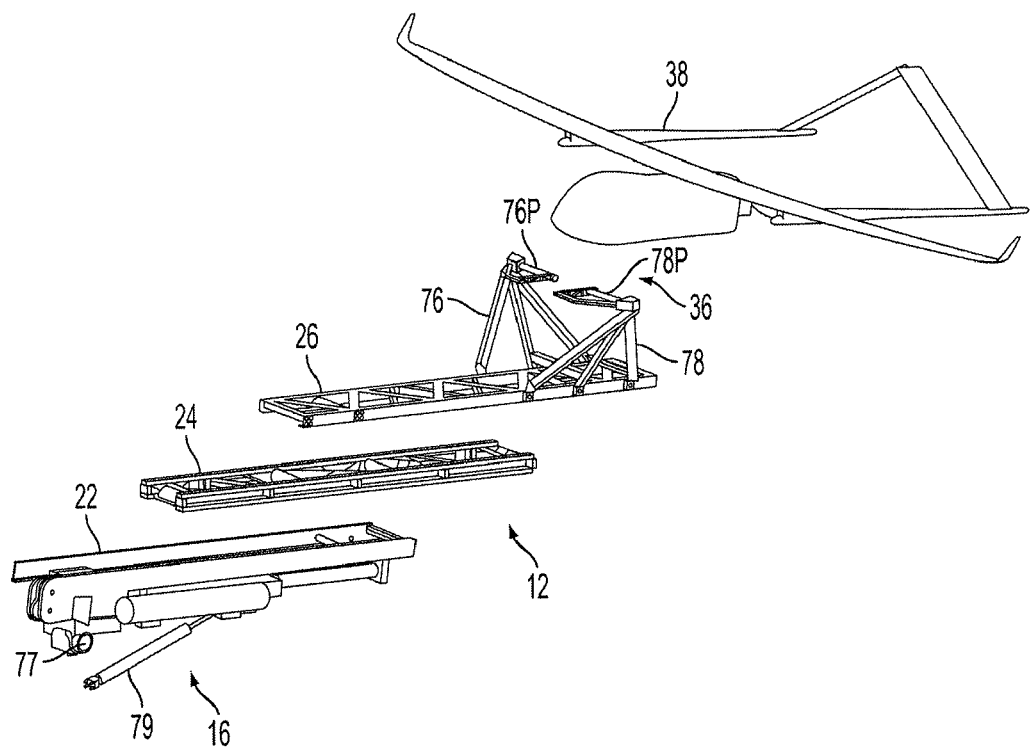
FIG. 16 is a perspective, partially exploded view of an illustrative UAV launcher according to an alternative embodiment of the present invention.

Referring to FIG. 16, a partially exploded, perspective view of an illustrative embodiment of the sliding frame 12 is shown. In the illustrative embodiment shown, the first sliding frame 24 and the second sliding frame 26 can comprise opposed side rails interconnected with a lattice-type structure, however, other configurations are possible. The base frame 22 can support the drive system 16, which in the illustrative embodiment shown, is mounted in or on the base frame.

Still referring to FIG. 16, the aircraft support 36 can comprise a cradle mounted to the second sliding frame 26. As shown in FIG. 16, the cradle can comprise opposed left and right uprights 76, 78 that can cradle the opposite sides of the aircraft's fuselage, or other portion of the aircraft 38. Each upright 76, 78 can include a respective pivot arm 76P, 78P that pivots with respect to the respective upright 76, 78 (see the arrows A in FIG. 18). A pivot bearing 77 and damper assembly 79 can be used to adjust the trajectory of the sliding frame 12.

Figure 17:
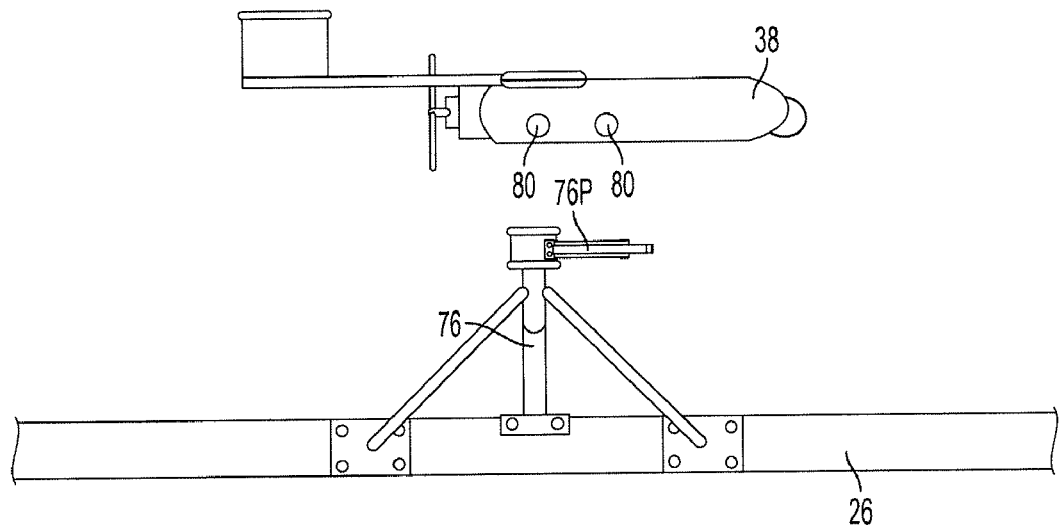
FIG. 17 is a side view of an illustrative aircraft cradle according to the present invention.
Figure 18:
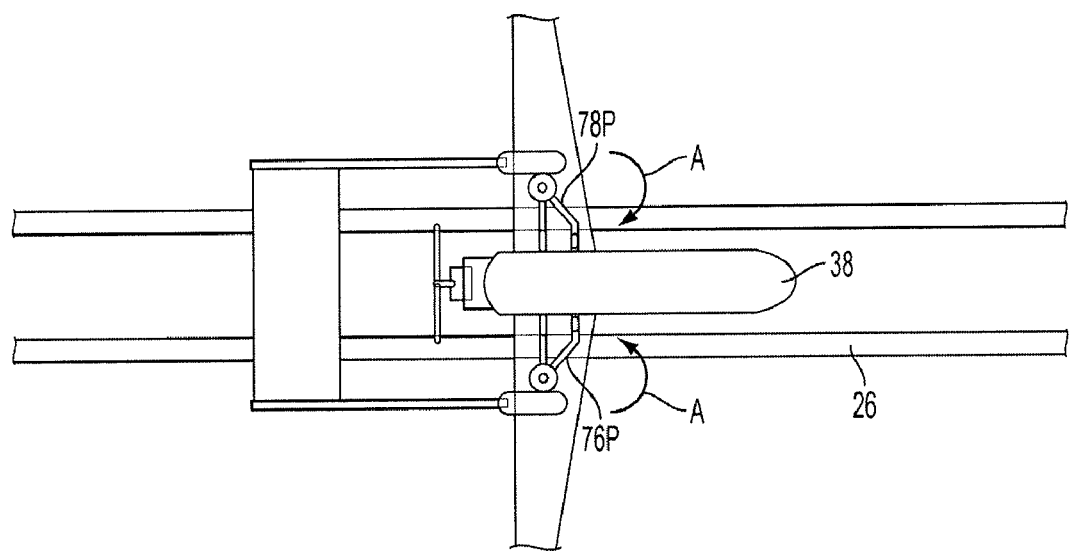
FIG. 18 is a top view of the illustrative aircraft cradle of FIG. 17.

Referring to FIGS. 17 and 18, the pivot arms 76P, 78P can pivot about the respective uprights 76, 78 toward (see arrows A in FIG. 18) and away from the UAV 38. This may facilitate mounting of the UAV 38 to the aircraft support 36. For example, each pivot arm 76P, 78P can include a distal portion that engages with a portion of the UAV 38, such as indentations 80 on, for example, both sides of the UAV 38, or other structures. Thus, when mounting the UAV 38 to the aircraft support 36, the pivot arms 76P, 78P can be pivoted into engagement with the indentations 80 to support the UAV 38.

According to an illustrative embodiment, for each upright 76, 78, a shear member, such as a shear pin (not shown), can engage both the upright 76, 78, and the respective pivot arm 76P, 78P. The shear members can lock each pivot arm 76P, 78P in the position where they engage the UAV 38, for example, prior to launch. The shear members can be configured to hold the pivot arms 76P, 78P from rotating under forward forces of the UAV when it's propeller is turning at full thrust. For example, the UAV's engine can be run at full RPM and the pivot arms 76P, 78P will still hold the UAV in position.

According to an illustrative embodiment, the pivot arms 76P, 78P won't release the UAV until the arresting system 20 stops forward movement of the sliding frame 12. When the sliding frame 12 reaches the aircraft separation position, the forward forces of the UAV 38 may be transmitted to the pivot arms 76P, 78P, which in turn, may tend to rotate the pivot arms 76P, 78P with respect to the uprights 76, 78 in the opposite direction of arrows A in FIG. 18. The shear members can have a low enough shear strength such that the forward forces of the UAV 38 shear the shear members, and allow the pivot arms 76P, 78P to pivot counter to arrows A in FIG. 18, thereby releasing the UAV 38 from the aircraft support 36, facilitating launch. The shear members can be replaced with new ones when the UAV launcher 10 is to be re-used. In the case where the UAV 38 is not launched, the shear members can be removed by the operator to facilitate removal of the UAV 38 from the aircraft support structure. One of ordinary skill in the art will appreciate that other aircraft support structures and release mechanisms re possible.

FIGS. 5, 9, 14, and 19 depict various illustrative hydraulic circuits 18 that may be used to operate the drive system 16 (e.g., to power the actuator 44 of FIG. 4). Referring to FIG. 5, an illustrative embodiment of the circuit 18 can include a hydraulic pump 80 powered, for example, by a DC motor 82. A relief valve 84 and an accumulator 86 can be connected to the output of the pump 80, for example, in line with one another. The accumulator 86 can comprise a nitrogen-over-oil accumulator used to store energy for powering the actuator 44. A poppet valve 88 can also be connected to the output of pump 80. A valve 90 can be connected to the output of the pump 80 and the input of poppet valve 88. To facilitate manual retraction of the sliding frame 12 (e.g., by the operator), a momentary vent valve 92 can be connected to the output of the poppet valve 88. The actuator 44 can also be connected to the output of the poppet valve 88.

FIG. 9 depicts an illustrative embodiment where the hydraulic circuit 18 can include a relatively small valve 94 for applying a pre-tension to the actuator 44, and a relatively large valve 92 for operating the actuator 44 to launch the UAV.

FIG. 14 depicts an alternative illustrative hydraulic circuit 18 that can be used with the present invention. Instead of the poppet valve 88 of FIG. 5, this alternative can use an electronically adjustable control valve 97 for supplying fluid to the hydraulic actuator 44. Adjustments in the electrical control signal can result in actuator speed changes. This circuit 18 may increase the aircraft weight and/or operating temperature range.

Figure 19:
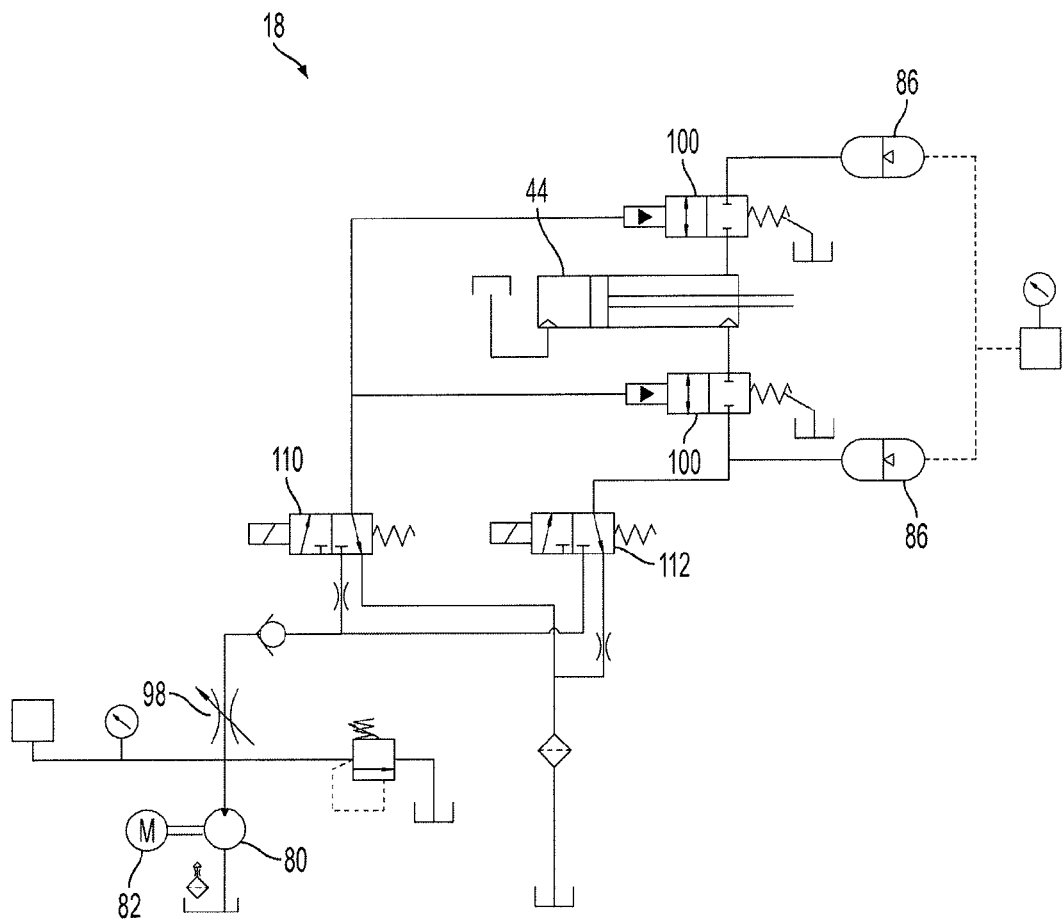
FIG. 19 is a schematic representation of an illustrative hydraulic circuit according to an alternative embodiment of the present invention.

FIG. 19 depicts another alternative hydraulic circuit 18 that can be used with the present invention. The hydraulic circuit 18 can include an AC electric motor 82 that drives a hydraulic pump 80. The pump 80 can be connected to a manual shutoff valve 98 that typically remains open, but can be closed, for example, during maintenance of the launcher 10. The hydraulic circuit 18 can further include a pair of accumulators 86 connected with the hydraulic actuator 44. The accumulators 86 can store energy as compressed nitrogen and hydraulic fluid. For example, launch cycle initiation can cause the hydraulic pump 80 to impel hydraulic fluid into the accumulators 86, compressing the nitrogen reservoir. The circuit 18 can further include pilot valves 100 that release the hydraulic fluid from the accumulators 86 into the hydraulic actuator 44, for example, in response to a launch signal. Additionally, the circuit 18 can include an electrically actuated pilot valve 110, which can operate pilot valves 100 when current is applied (e.g., in response to a launch signal). Additionally, the circuit 18 can include an electrically operated vent valve 112, that can vent the circuit 18. In addition to the hydro-pneumatic drive systems depicted in this disclosure, other types of drive systems such as pneumatic, mechanical, and electrical can be used.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. An aircraft launcher, comprising:
a base frame comprising a first end and a second end;
a first sliding frame comprising a first end and a second end;
 wherein the first sliding frame slides with respect to the base frame;
a second sliding frame comprising a first end and a second end;
 wherein the second sliding frame slides with respect to the first frame;
an aircraft support located on the second sliding frame;
a drive apparatus which slides at least one of the first sliding frame and the second sliding frame with respect to the base frame;
 wherein the launcher in an extended configuration has the first end of the first sliding frame located between the first and second end of the base frame and the second end of the first sliding frame extends beyond the second end of the base frame, and the first end of the second sliding frame is located between the first and second end of the first sliding frame and the second end of the second sliding frame is extended beyond the second end of the first frame; and
 wherein the launcher in a retracted position has the second end of the first sliding frame located between the first and second end of the base frame and the first end of the first sliding frame extends beyond the first end of the base frame, and the second end of the second sliding frame is located between the first and second end of the first sliding frame and the first end of the second sliding frame is extended beyond the first end of the first frame.

2. The aircraft launcher of claim 1, wherein the first sliding frame slides along a first axis, and the second sliding frame slides along a second axis substantially parallel to the first axis.

3. The aircraft launcher of claim 1, further comprising a timing apparatus that coordinates sliding of the first sliding frame and the second sliding frame with respect to the base frame.

4. The aircraft launcher of claim 3, wherein the drive apparatus imparts movement to the first sliding frame with respect to the base frame, and the timing apparatus imparts movement to the second sliding frame with respect to the base frame.

5. The aircraft launcher of claim 3, wherein the timing apparatus comprises a belt coupled to the base frame, the first sliding frame, and the second sliding frame.

6. The aircraft launcher of claim 1, wherein the drive apparatus comprises an actuator that imparts movement to at least one of the first sliding frame and the second sliding frame with respect to the base frame.

7. The aircraft launcher of claim 6, wherein the actuator comprises a linear actuator.

8. The aircraft launcher of claim 6, wherein the actuator is coupled to at least one of the first sliding frame and the second sliding frame via a pulley system.

9. The aircraft launcher of claim 6, further comprising a hydraulic circuit that powers the actuator.

10. The aircraft launcher of claim 1, further comprising an arresting apparatus that decelerates or stops movement of the first sliding frame and the second sliding frame with respect to the base frame.

11. The aircraft launcher of claim 10, wherein the arresting apparatus comprises a belt coupled to at least one of the first sliding frame and the second sliding frame.

12. The aircraft launcher of claim 11, wherein the arresting apparatus further comprises an elastic member coupled to the belt.

13. The aircraft launcher of claim 1, wherein the aircraft support comprises a cradle including a first pivot arm adapted to pivot into engagement with a first side of an aircraft, and a second pivot arm adapted to pivot into engagement with a second, opposite side of the aircraft.

14. The aircraft launcher of claim 13, further comprising:
a first shear member adapted to hold the first pivot arm in engagement with the first side of the aircraft; and
a second shear member adapted to hold the second pivot arm in engagement with the second side of the aircraft;
wherein at least one of the first shear member or the second shear member shears when the aircraft separates from the cradle during launch.

15. The aircraft launcher of claim 1, further comprising:
a first anti-friction slide located between the base frame and the first sliding frame; and
a second anti-friction slide located between the first sliding frame and the second sliding frame.

16. The aircraft launcher of claim 1, further comprising:
at least one roller bearing located between the base frame and the second sliding frame.

17. An aircraft launcher, comprising:
a base frame;
a first sliding frame that slides with respect to the base frame;
 the first sliding frame defining a first longitudinal length;
a second sliding frame that slides with respect to first sliding frame;
 the second sliding frame defining a second longitudinal length;
an aircraft support located on the second sliding frame;
a drive apparatus which slides at least one of the first sliding frame and second sliding frame with respect to the base frame between a fully retracted position and a fully extended position;
 wherein about one-half or less of the first longitudinal length of the first sliding frame overlaps the base frame when in the fully retracted position, and about one-half or less of the first longitudinal length of the first sliding frame overlaps the base frame when in the fully extended position; and
 wherein about one-half or less of the second longitudinal length of the second sliding frame overlaps the first frame when in the fully retracted position, and about one-half or less of the second longitudinal length of the second sliding frame overlaps the first frame when in the fully extended position.

* * * * *